(12) United States Patent
Novack

(10) Patent No.: US 7,444,883 B2
(45) Date of Patent: Nov. 4, 2008

(54) VIBRATING BEAM FORCE TRANSDUCER

(75) Inventor: Mitchell J. Novack, Kenmore, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/317,384

(22) Filed: Dec. 22, 2005

(65) Prior Publication Data

US 2007/0144269 A1   Jun. 28, 2007

(51) Int. Cl.
   *G01N 3/08* (2006.01)
(52) U.S. Cl. ......................................... 73/826
(58) Field of Classification Search ............. 73/826
   See application file for complete search history.

(56) References Cited

U.S. PATENT DOCUMENTS

| | | | |
|---|---|---|---|
| 4,215,570 A | 8/1980 | Eer Nisse | |
| 4,221,131 A | 9/1980 | Albert | |
| 4,372,173 A | 2/1983 | Eer Nisse et al. | |
| 4,467,651 A | 8/1984 | Peters et al. | |
| 4,587,853 A | 5/1986 | Komoto et al. | |
| 4,649,759 A * | 3/1987 | Lee | 73/862.626 |
| 4,656,383 A * | 4/1987 | Albert | 310/321 |
| 4,718,275 A | 1/1988 | Norling | |
| 4,766,768 A | 8/1988 | Norling et al. | |
| 4,785,215 A | 11/1988 | Blech | |
| 4,879,914 A | 11/1989 | Norling | |
| 5,005,413 A | 4/1991 | Novack et al. | |
| 5,109,175 A * | 4/1992 | Albert | 310/321 |
| 5,165,279 A * | 11/1992 | Norling et al. | 73/514.14 |
| 5,168,756 A | 12/1992 | Hulsing, II | |
| 5,241,861 A | 9/1993 | Hulsing, II | |
| 5,243,278 A | 9/1993 | Hulsing, II | |
| 5,313,023 A * | 5/1994 | Johnson | 177/229 |
| 5,314,572 A | 5/1994 | Core et al. | |
| 5,326,726 A | 7/1994 | Tsang et al. | |
| 5,331,853 A | 7/1994 | Hulsing, II | |
| 5,334,901 A | 8/1994 | Albert et al. | |
| 5,336,854 A | 8/1994 | Johnson | |
| 5,345,824 A | 9/1994 | Sherman et al. | |
| 5,391,844 A | 2/1995 | Johnson et al. | |
| 5,396,797 A | 3/1995 | Hulsing, II | |
| 5,417,111 A | 5/1995 | Sherman et al. | |
| 5,442,146 A | 8/1995 | Bell et al. | |
| 5,594,170 A | 1/1997 | Peters | |
| 5,604,336 A * | 2/1997 | Johnson | 177/229 |
| 5,620,931 A | 4/1997 | Tsang et al. | |
| 5,627,314 A | 5/1997 | Hulsing, II | |
| 5,646,347 A | 7/1997 | Weiblen et al. | |
| 5,847,280 A | 12/1998 | Sherman et al. | |
| 5,905,201 A | 5/1999 | Petri | |
| 5,920,011 A | 7/1999 | Hulsing, II | |
| 5,962,784 A | 10/1999 | Hulsing, II | |
| 5,996,411 A | 12/1999 | Leonardson et al. | |
| 6,009,753 A | 1/2000 | Tsang et al. | |
| 6,192,757 B1 | 2/2001 | Tsang et al. | |
| 6,273,514 B1 | 8/2001 | Hulsing, II | |

(Continued)

*Primary Examiner*—Edward Lefkowitz
*Assistant Examiner*—Octavia Davis

(57) ABSTRACT

An apparatus and method for monolithic force transducers in which a sensed force is applied across only two ends of a pair of force sensing elements so that the pair of force sensing elements are loaded in series with one in compression and the other in tension, whereby the force sensed by each of the two force sensing elements are identically equal in magnitude but opposite in sense.

20 Claims, 2 Drawing Sheets

U.S. PATENT DOCUMENTS

| | | |
|---|---|---|
| 6,285,111 B1 | 9/2001 | Hulsing, II |
| 6,595,054 B2 * | 7/2003 | Paros et al. ............... 73/504.04 |
| 6,633,008 B2 * | 10/2003 | Johnson ..................... 177/184 |
| 6,662,658 B2 | 12/2003 | Foote |
| 6,807,872 B2 * | 10/2004 | Le Traon et al. ........ 73/862.632 |
| 6,910,392 B2 * | 6/2005 | Lockery et al. ......... 73/862.627 |

\* cited by examiner

VIBRATING BEAM FORCE TRANSDUCER

GOVERNMENT INTEREST

A U.S. Government contract provided for by the terms of F29601-03-C-0124 awarded by the Air Force Research Laboratories (AFRL) may apply to this application. The U.S. Government may have certain rights pertaining to this application.

FIELD OF THE INVENTION

The present invention relates to vibrating beam force transducers, and in particular to micro-machined vibrating beam force transducers.

BACKGROUND OF THE INVENTION

Vibrating beam force transducers are used as force sensing elements in sensor instruments, such as accelerometers and pressure sensors. It is often advantageous to design these sensors using two vibrating beam transducers such that the quantity being sensed, e.g., acceleration or pressure, forces one transducer in tension and the other in compression. The purpose of this arrangement is to reduce errors by canceling common mode errors, such as even order nonlinearities, bias temperature sensitivity, clock sensitivity, bias aging drift, and pressure sensitivity. However, this method of error cancellation is only effective to the extent that the two force sensing elements experience the same force loading by the quantity being sensed. If the two force sensing elements do not share equal and opposite force loading, then sensor accuracy is compromised.

A common method of accomplishing this in force transducer systems is a push-pull arrangement in which the force sensing elements are subjected to forces in opposite directions. However, problems arise when the push-pull arrangement is implemented in a physical device. For example, to utilize push-pull force sensing elements in a pendulous accelerometer, two force sensing elements are both connected to a common proof mass. The force sensing elements typically extend either perpendicular to or parallel to the pendulous axis of the accelerometer. However in such a configuration, any thermal expansion mismatch between the support/proof mass assembly and the force sensing elements creates thermal strains that in turn create large common mode error signals that can only be partially suppressed by signal processing techniques. As a result, the force sensing elements should be physically matched in all sensitivities, in order to provide a high level of common mode rejection. This close matching is often difficult to achieve.

Therefore, devices and methods for overcoming these and other limitations of typical state of the art sensor instruments are desirable.

SUMMARY OF THE INVENTION

The present invention is an apparatus and method for monolithic force transducers in which a sensed force is applied across only two ends of a pair of force sensing elements so that the pair of force sensing elements are loaded in series with one in compression and the other in tension, whereby the force sensed by each of the two force sensing elements are identically equal in magnitude but opposite in sense. The series loading of the pair of force sensing elements results in substantially complete error cancellation for the sensor output.

Each of the two vibrating beam transducers within the monolithic transducer can be any of the general variety of vibrating beam transducers available in the prior art. For example, the vibrating beam transducers may be dual vibrating beams, or single vibrating beam, or single vibrating beams with dynamic isolation, to name three common varieties.

According to one aspect of the invention, the monolithic force transducer is fabricated is using either single crystal quartz or single crystal silicon. Fabrication using single crystal quartz permits use of metal electrodes on the beams for driving the vibrating beams and sensing the vibration.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements. Axes are shown having directional arrow heads only for clarity of the description, and no limitation is intended thereby.

The Figures illustrate the method of the present invention for a monolithic force transducer capable of being attached between different first and second sensor structures. The architecture of the monolithic force transducer of the present invention includes a unitary body formed from a crystalline substrate, the unitary body having first and second mounting elements for mounting the force transducer to the first and second sensor structures, respectively. First and second force sensing elements are formed with each of the force sensing elements having first and second ends, each force sensing element being sensitive along a common force sensing axis to a force exerted thereto in either direction. A coupling frame is structured for interconnecting the mounting elements and force sensing elements such that the first force sensing element has only its first end connected to the first mounting element and its second end connected to the second end of the second force sensing element, and such that the second force sensing element has only its first end connected to the second mounting element and its second end connected to the second end of the first sensing element, whereby a force exerted on the monolithic force transducer by the first and second sensor structures along the common force sensing axis results in a compression force in one force sensing element and a tension force in the other force sensing element.

Furthermore, in contrast prior art devices, the architecture of the monolithic force transducer causes only the first ends of the respective first and second force sensing elements to be connected to the first and second sensor structures through respective first and second mounting elements. Therefore, the architecture of the monolithic force transducer has only two ends across which the force is applied, and the two force sensing elements that make up the monolithic transducer are loaded in series, whereby the force sensed by each of the two force sensing elements are identically equal in magnitude but opposite in sense, which results in substantially complete error cancellation for the sensor output.

Figure 1:
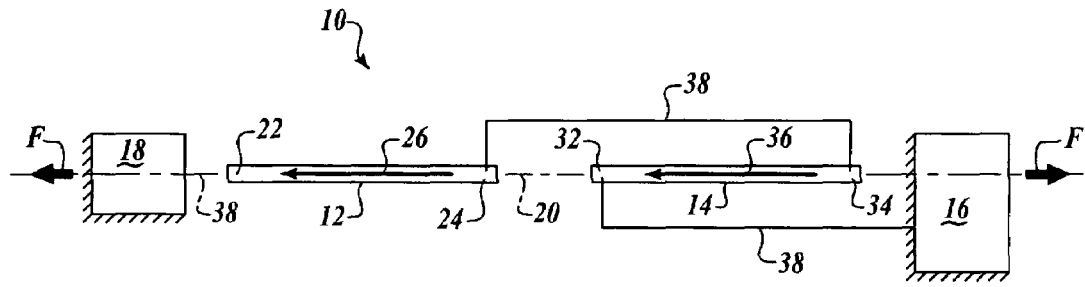
FIG. 1 is a schematic view for describing in the general case a theoretical operation of a monolithic force transducer of the present invention.

FIG. 1 is a schematic for describing in the general case the theoretical operation of a monolithic force transducer 10 of the present invention. Different numerals are used indicate the elements because FIG. 1 is intended to explain theoretical operation of any monolithic force transducer 10 of the present invention, while FIGS. 2-5 describe actual embodiments of the monolithic force transducer 10 of the present invention. The monolithic force transducer 10 includes a pair of matched force sensing elements 12 and 14 connected between mounting elements 16 and 18. The mounting elements 16, 18 couple the monolithic force transducer 10 to the appropriate structures in a sensor. For example in an accelerometer, mounting element 16 is connected to a support, and mounting element 18 is connected to a pendulously mounted proof mass. These structures 16, 18 apply a tension or compression force F on the monolithic force transducer 10 along a transducer axis 20 that is common to both force sensing elements 12, 14. The transducer 10 senses this force F, and responsively provides an output that is a measure of the acceleration or other quantity of interest.

Force sensing element 12 includes first end 22 and second end 24 with a first force sensing axis 26 extending from second end 24 to first end 22. Force sensing element 14 similarly includes first end 32 and second end 34 with a second force sensing axis 36 extending from second end 34 to first end 32. The respective force sensing axes 26, 36 are parallel and linearly aligned substantially coincident with one another and with transducer axis 20, whereby transducer axis 20 defines a common force sensing axis of the monolithic force transducer 10. For both force sensing elements, their respective first ends 22, 32 lie closer to mounting element 16, and their second ends 24, 34 lie closer to mounting element 18. Thus, respective force sensing axes 26 and 36 also point in the same direction along the common transducer axis 20.

With the above nomenclature, the present invention can be described as one in which different connectors 38 interconnect the force sensing elements 12, 14 with the mounting elements 16, 18, such that force sensing element 12 has its first end 22 connected to mounting element 18 and its second end 24 connected to mounting element 16 only through force sensing element 14, and such that force sensing element 14 has its first end 32 connected to mounting element 16 and its second end 34 connected to mounting element 18 only through force sensing element 12. A component of force F exerted on mounting element 16 is therefore coupled to first end 32 of force sensing element 14, and to second end 24 of force sensing element 12 only through force sensing element 14. Similarly, an opposite component of force F exerted on mounting element 18 is coupled to first end 22 of force sensing element 12, and to second end 34 of force sensing element 14 only through force sensing element 12. As a result of this coupling scheme, any force F (either tension or compression) exerted between mounting elements 16 and 18 along the common force sensing axis 20 generates a compression force in one force sensing element, and a tension force in the other force sensing element.

Furthermore, only first ends 22 and 32 of respective force sensing elements 12 and 14 are connected to the sensor structures through respective mounting elements 18, 16. Therefore, the architecture of the monolithic force transducer has only two ends across which any force F is exerted, and the two force sensing elements 12, 14 that make up the monolithic transducer 10 are loaded in series, whereby the force F sensed by each of the two force sensing elements are identically equal in magnitude but opposite in sense, which results in substantially complete error cancellation for the sensor output.

Figure 2:
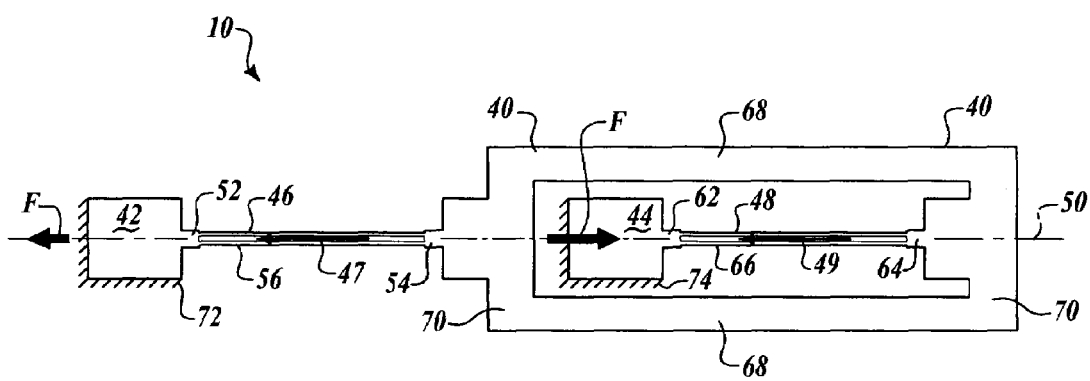
FIG. 2 illustrates one embodiment of the monolithic force transducer of the present invention.

FIG. 2 illustrates one embodiment of the monolithic force transducer 10 of the present invention. The transducer 10 includes frame 40 configured so as to space apart a pair of mounting elements 42 and 44 with spaced-apart force sensing elements 46 and 48 positioned in an arrangement similar to that shown in FIG. 1. Spaced-apart force sensing elements 46, 48 are formed along respective force sensing axes 47, 49 that are aligned with mounting elements 42 and 44 along and substantially coincident with a force sensing axis 50 of the monolithic force transducer 10. Force sensing axes 47, 49 of respective force sensing elements 46, 48 thus form a common force sensing axis with axis 50 of the monolithic force transducer 10.

The force sensing elements 46, 48 are illustrated as being of the dual vibrating beam type, although other types of force transducers, such as single vibrating beam transducers, single vibrating beams with dynamic isolation, surface acoustic wave transducers, and piezoresistive strain gauges may be substituted without deviating from the scope and intent of the invention. Force sensing element 46 is connected to mounting element 42 and has a first end 52, a second end 54, and a pair of elongated beams 56 extending between ends 52 and 54 when configured as the dual vibrating beam type, as illustrated. Only first end 52 of force sensing element 46 is connected to mounting element 42. Force sensing element 48 is connected to mounting element 44 and has a first end 62, a second end 64, and a pair of elongated beams 66 connected between ends 62 and 64 when configured as the dual vibrating beam type, as illustrated. Only first end 62 of force sensing element 48 is connected to mounting element 44. The respective beams 56, 66 thus lie along respective force sensing axes 47, 49 of force sensing element 46, 48, which beams are linearly aligned along and substantially coincident with force sensing axis 50 of the monolithic force transducer 10.

Respective second ends 54, 64 of force sensing elements 46, 48 are connected only to frame 40 that extends therebetween along transducer axis 50. Frame 40 is connected only to respective second ends 54, 64 of force sensing elements 46, 48, exclusive of first ends 52, 62.

By example and without limitation, frame 40 includes a pair of lengthwise arms 68 that extend on either side of force sensing element 48 parallel with common force sensing axis 50, and a pair of integral crosswise arms 70 that interconnect the pair of lengthwise arms 68 on either end of force sensing element 48. Crosswise arms 70 are connected only to respective second ends 54, 64 of force sensing elements 46, 48. Lengthwise arms 68 and crosswise arms 70 of frame 40 are configured longer and wider, respectively, than force sensing element 48, whereby frame 40 forms a closed rectangle that entirely surrounds and encompasses both force sensing element 48 and mounting element 44 connected to first end 62 thereof. Mounting elements 42 and 44 are attached to sensor structures 72 and 74 respectively, such that the monolithic force transducer 10 provides a measurement of the tension or compression force F coupled thereto by these structures.

Force transducer frame 40 is formed in combination with force sensing elements 46, 48 and mounting elements 42, 44 as an integral and unitary structure, rather than an assembly of initially separate parts. For example, frame 40 may be formed in combination with force sensing elements 46, 48 and mounting elements 42, 44 by etching a substrate of either single crystal quartz or single crystal silicon. Single crystal quartz permits use of metal electrodes on the beams (not shown) for driving the vibrating beams and sensing the vibration. Accordingly, force sensing elements 46, 48 are formed from closely spaced positions in a common material, producing a pair of force sensing elements having closely matched sensitivities. This close matching of sensitivities provides good common mode rejection of errors when conventional means are used for combining the force sensing element outputs.

Furthermore, only first ends 52 and 62 of respective force sensing elements 46 and 48 are connected to the sensor structures 72, 74 through respective mounting elements 42, 44. Therefore, the architecture of the monolithic force transducer 10 has only two ends 52 and 62 across which any force F is exerted, such that the two force sensing elements 46, 48 are loaded in series, whereby the force F sensed by each of force sensing elements 46, 48 are identically equal in magnitude but opposite in sense, which results in substantially complete error cancellation for the sensor output.

Figure 3:
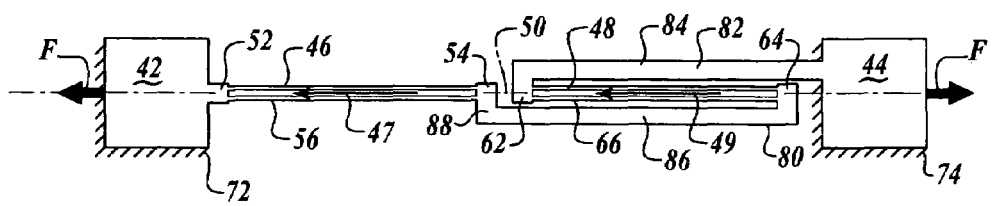
FIG. 3 illustrates another embodiment of the monolithic force transducer of the present invention.

FIG. 3 illustrates another embodiment of the monolithic force transducer 10 of the present invention. The transducer 10 includes an alternatively configured frame 80 that is also configured so as to space apart a pair of mounting elements 42 and 44 with spaced-apart force sensing elements 46 and 48 positioned in an arrangement similar to that shown in FIG. 1. Spaced-apart force sensing elements 46, 48 are again formed along respective force sensing axes 47, 49 that are aligned with mounting elements 42 and 44 along and substantially coincident with force sensing axis 50 of the monolithic force transducer 10. Force sensing axes 47, 49 of respective force sensing elements 46, 48 thus again form a common axis with force sensing axis 50 of the monolithic force transducer 10.

Again, only first end 52 of force sensing element 46 is connected to mounting element 42, and only first end 62 of force sensing element 48 is a connected to mounting element 44. Another frame 82 includes at least one lengthwise arm 84 extended along side force sensing element 48 and being connected between first end 62 of force sensing element 48 and second mounting element 44.

Respective second ends 54, 64 of force sensing elements 46, 48 are connected only to frame 80 that extends therebetween in parallel orientation with transducer axis 50. By example and without limitation, alternative frame 80 includes at least one lengthwise arm 86 extended along side force sensing element 48, and at least one crosswise arm 88 integral therewith and positioned adjacent to first end 62 of force sensing element 48. The lengthwise arm 86 is connected to second end 64 of force sensing element 48, and crosswise arm 88 is connected to second end 54 of force sensing element 46, such that first part 80a of alternative frame 80 interconnects respective second ends 54, 64 of force sensing elements 46, 48, exclusive of respective first ends 52, 62.

Lengthwise arms 86 and 84 of respective frames 80, 82 optionally extend parallel with common force sensing axis 50 on opposite sides of force sensing element 48. Thus, frames 80, 82 combine to form a partial rectangle that substantially surrounds and nearly encompasses force sensing element 48, but excludes mounting element 44 connected to first end 62 thereof.

Mounting elements 42 and 44 are attached to sensor structures 72 and 74 respectively, such that the monolithic force transducer 10 provides a measurement of the tension or compression force F coupled thereto by these structures.

Force sensing elements 46, 48 are again illustrated as being of the dual vibrating beam type, and other types of force transducers, such as single vibrating beam transducers, single vibrating beams with dynamic isolation, surface acoustic wave transducers, and piezoresistive strain gauges may be substituted without deviating from the scope and intent of the invention. When configured as the dual vibrating beam type as illustrated, force sensing element 46 includes the pair of elongated beams 56 extending between ends 52 and 54. When configured as the dual vibrating beam type as illustrated, force sensing element 48 includes the pair of elongated beams 66. The respective beams 56, 66 thus again lie along respective force sensing axes 47, 49 of force sensing element 46, 48, which beams are again linearly aligned along and substantially coincident with force sensing axis 50 of the monolithic force transducer 10.

Alternative force transducer frame 80 is formed in combination with force sensing elements 46, 48 and mounting elements 42, 44 as an integral and unitary structure, rather than an assembly of initially separate parts. For example, frame 80 may be formed in combination with force sensing elements 46, 48 and mounting elements 42, 44 by etching a substrate of either single crystal quartz or single crystal silicon. Accordingly, force sensing elements 46 and 48 are formed from closely spaced positions in a common material, producing a pair of force sensing elements having closely matched sensitivities. This close matching of sensitivities provides good common mode rejection of errors when conventional means are used for combining the force sensing element outputs.

Furthermore, again only first ends 52, 62 of force sensing element 46, 48 are connected to the sensor structures 72, 74 through respective mounting elements 42, 44. Therefore, the architecture of the monolithic force transducer 10 has only two ends across which any force F is exerted, such that the two force sensing elements 46, 48 are loaded in series, whereby the force F sensed by each of force sensing elements 46, 48 are identically equal in magnitude but opposite in sense, which results in substantially complete error cancellation for the sensor output.

Figure 4:
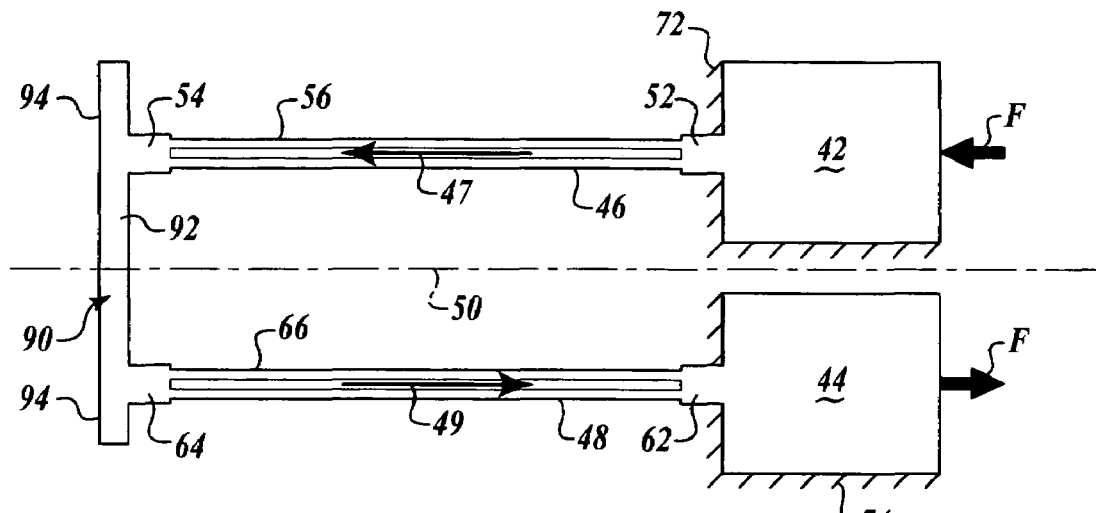
FIG. 4 illustrates another embodiment of the monolithic force transducer of the present invention suitable for use with side-by-side sensor structures.

FIG. 4 illustrates another embodiment of the monolithic force transducer 10 of the present invention suitable for use with side-by-side sensor structures 72 and 74. The transducer 10 includes an alternatively configured frame 90 that is configured so as to space apart a pair of mounting elements 42 and 44 with laterally spaced-apart force sensing elements 46 and 48 being arranged substantially parallel and side-by-side with one another, in an arrangement similar to that shown in FIG. 1. Force sensing axes 47, 49 lie along respective beams 56, 66 of respective force sensing element 46, 48, which beams are laterally spaced-apart and aligned substantially parallel with force sensing axis 50 of the monolithic force transducer 10.

Again, only first end 52 of force sensing element 46 is connected to mounting element 42, and only first end 62 of force sensing element 48 is a connected to mounting element 44.

Respective second ends 54, 64 of force sensing elements 46, 48 are only connected to frame 90 that extends therebetween crosswise and substantially perpendicular to transducer axis 50. By example and without limitation, alternative frame 90 includes a single lengthwise arm 92 that is connected only between respective second ends 54, 64 of force sensing elements 46, 48 crosswise and substantially perpendicular to common force sensing axis 50, exclusive of first ends 52, 62. According to the alternative frame 90, single lengthwise arm 92 includes outriggers 94 that extend from opposite ends thereof crosswise of both force sensing elements 46 and 48 and there beyond.

Mounting elements 42 and 44 are attached to sensor structures 72 and 74 respectively, such that the monolithic force transducer 10 provides a measurement of the tension or compression force F coupled thereto by these structures.

The force sensing elements 46, 48 are again illustrated as being of the dual vibrating beam type, and other types of force transducers, such as single vibrating beam transducers, single vibrating beams with dynamic isolation, surface acoustic wave transducers, and piezoresistive strain gauges may be substituted without deviating from the scope and intent of the invention. When configured as the dual vibrating beam type as illustrated, force sensing element 46 includes the pair of elongated beams 56 extending between ends 52 and 54. When configured as the dual vibrating beam type as illustrated, force sensing element 48 includes the pair of elongated beams 66.

Alternative force transducer frame 90 is formed in combination with force sensing elements 46, 48 and mounting elements 42, 44 as an integral and unitary structure, rather than an assembly of initially separate parts. For example, frame 90 may be formed in combination with force sensing elements 46, 48 and mounting elements 42, 44 by etching a substrate of either single crystal quartz or single crystal silicon. Accordingly, force sensing elements 46 and 48 are formed from closely spaced positions in a common underlying material, producing a pair of force sensing elements having closely matched sensitivities. This close matching of sensitivities provides good common mode rejection of errors when conventional means are used for combining the force sensing element outputs.

Furthermore, again only first ends 52, 62 of force sensing element 46, 48 are connected to the sensor structures 72, 74 through respective mounting elements 42, 44. Therefore, the architecture of the monolithic force transducer 10 has only two ends across which any force F is exerted, such that the two force sensing elements 46, 48 are loaded in series, whereby the force F sensed by each of force sensing elements 46, 48 are identically equal in magnitude but opposite in sense, which results in substantially complete error cancellation for the sensor output.

Figure 5:
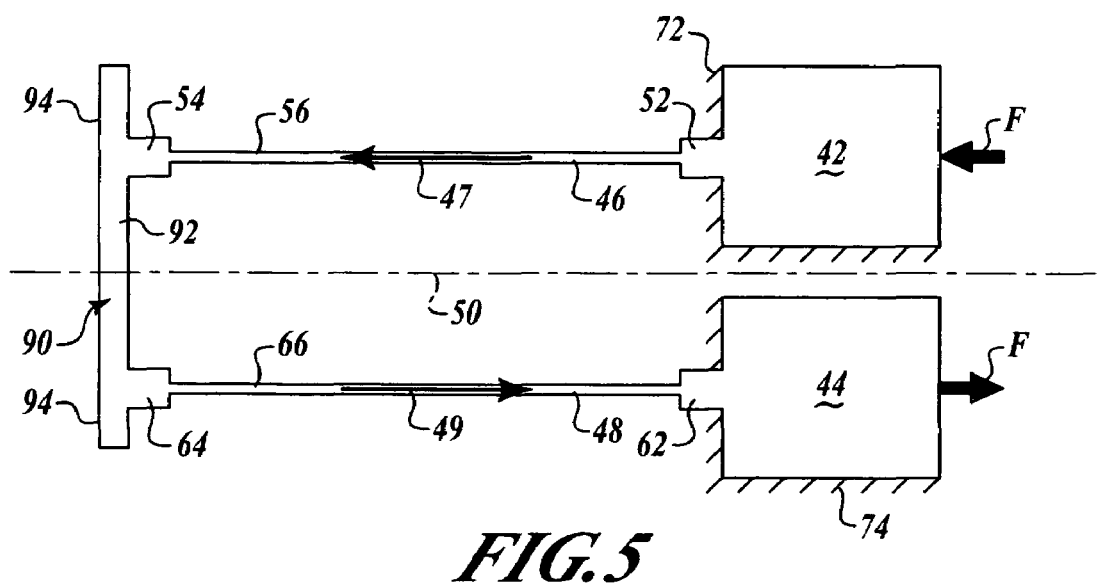
FIG. 5 illustrates another embodiment of the monolithic force transducer of the present invention suitable for use with side-by-side sensor structures wherein the force sensing elements are vibrating beam transducers of the single beam type.

FIG. 5 illustrates another embodiment of the monolithic force transducer 10 of the present invention suitable for use with side-by-side sensor structures 72 and 74 wherein force sensing elements 46, 48 are vibrating beam transducers of the single beam type having single elongated beams 56, 66, respectively. Respective second ends 54, 64 of force sensing elements 46, 48 are only connected to frame 90 that extends therebetween crosswise and substantially perpendicular to transducer axis 50. Only first ends 52, 62 of force sensing element 46, 48 are connected to the sensor structures 72, 74 through respective mounting elements 42, 44.

While the preferred embodiment of the invention has been illustrated and described, it will be appreciated that various changes can be made therein without departing from the spirit and scope of the invention.

What is claimed is

1. A monolithic force transducer capable of being attached between spaced apart first and second sensor structures, the force transducer comprising:

first and second spaced apart mounting elements for mounting to the spaced apart first and second sensor structures, respectively;

first and second force sensing elements having respective first and second force sensing axes associated therewith both oriented substantially parallel with a transducer force sensing axis and being sensitive to a force exerted thereto in either direction; and the first and second force sensing elements having respective first ends being directly, exclusively connected to respective first and second spaced apart mounting elements, and respective second ends being mutually interconnected, such that a force exerted on the first and second mounting elements of the force transducer by the sensor structures parallel with the transducer force sensing axis results in a compression force in one of the first and second sensing elements and a tension force in the other of the first and second sensing elements.

2. The monolithic force transducer of claim 1, further comprising a coupling frame exclusively interconnecting respective second ends of the first and second force sensing elements.

3. The monolithic force transducer of claim 2 wherein the respective force sensing axis are further substantially coincident with the transducer force sensing axis.

4. The monolithic force transducer of claim 2 wherein the coupling frame substantially surrounds one of the first and second force sensing elements and one of the first and second mounting elements corresponding thereto.

5. The monolithic force transducer of claim 2, further comprising a frame extending between a first end of one of the first and second force sensing elements and one of the first and second mounting elements corresponding thereto.

6. The monolithic force transducer of claim 1 wherein the first and second force sensing elements are further arranged laterally spaced-apart.

7. The monolithic force transducer of claim 1 wherein each of the first and second force sensing elements further comprises a force transducer selected from the group of force transducers consisting of: a dual vibrating beam transducer, a single vibrating beam transducer, a single vibrating beam transducer with dynamic isolation, a surface acoustic wave transducer, and a piezoresistive strain gauge.

8. A monolithic force transducer capable of being attached between first and second sensor structures, the force transducer comprising:

first and second mounting elements for mounting the force transducer to the first and second sensor structures, respectively;

first and second force sensing elements having respective force sensing axes oriented parallel with one another and with a transducer force sensing axis and being sensitive to a force exerted thereto in either direction, a first end of the first force sensing element being exclusively interconnected with the first mounting element, and a first end of the second force sensing element being directly, exclusively interconnected with the second mounting element; and a coupling frame that is structured for exclusively interconnecting respective second ends of the first and second force sensing elements, such that a force exerted on the first and second mounting elements of the force transducer by the sensor structures parallel with the transducer force sensing axis results in a compression force in the first force sensing element and a tension force in the second force sensing element.

9. The monolithic force transducer device of claim 8 wherein the first and second force sensing elements and the respective force sensing axis thereof are substantially coincident with the transducer force sensing axis.

10. The monolithic force transducer of claim 9, further comprising a frame extending substantially a full length of the second force sensing element and exclusively connecting the first end thereof and the second mounting element.

11. The monolithic force transducer of claim 9 wherein the coupling frame further comprising a pair of crosswise arms interconnecting first and second opposite ends of a pair of lengthwise arms, the pairs of lengthwise and crosswise arms surrounding the second force sensing element and the second mounting element.

12. The monolithic force transducer of claim 8 wherein the first and second force sensing elements are arranged side-by-side and laterally spaced-apart on opposite sides of the transducer force sensing axis with the coupling frame extended therebetween.

13. The monolithic force transducer of claim 8 wherein each of the first and second force sensing elements further comprises a force transducer selected from the group of force transducers consisting of a dual vibrating beam transducer, a single vibrating beam transducer, and a single vibrating beam transducer with dynamic isolation.

14. The monolithic force transducer of claim 7 wherein each of the first and second force sensing elements is further formed of a crystalline substrate.

15. The monolithic force transducer of claim 8 wherein the mounting elements and force sensing elements are integrally formed with the coupling frame.

16. A method for forming a monolithic force transducer capable of being attached between spaced apart first and second sensor structures, the method comprising:

in a crystalline substrate, forming first and second spaced apart mounting elements structured for mounting to the spaced apart first and second sensor structures, respectively;

in the crystalline substrate, forming first and second force sensing elements having respective first and second force sensing axes associated therewith both oriented substantially parallel with a transducer force sensing axis and being sensitive to a force exerted thereto in either direction; and the first and second force sensing elements being formed having respective first ends being directly, exclusively connected to respective first and second spaced apart mounting elements, and respective second ends being mutually interconnected, such that a force exerted on the first and second mounting elements by the sensor structures parallel with the transducer force sensing axis results in a compression force in one of the first and second sensing elements and a tension force in the other of the first and second sensing elements.

17. The method of claim 16, further comprising in the crystalline substrate, forming a coupling frame exclusively interconnecting respective second ends of the first and second force sensing elements.

18. The method of claim 17 wherein forming the first and second force sensing elements further comprises, in the crystalline substrate, forming the first and second force sensing elements having respective first and second force sensing axes associated therewith both aligned substantially coincident with the transducer force sensing axis; and wherein forming the coupling frame further comprises, in the crystalline substrate, forming a plurality of arms substantially surrounding one of the first and second force sensing elements and the one of the first and second mounting elements corresponding thereto.

19. The method of claim 17 wherein forming the first and second force sensing elements further comprises, in the crystalline substrate, forming the first and second force sensing elements having respective first and second force sensing axes associated therewith both aligned substantially coincident with the transducer force sensing axis; and wherein forming the coupling frame further comprises, in the crystalline substrate, forming a plurality of arms exclusively interconnecting respective second ends of the first and second force sensing elements; and further comprising, in the crystalline substrate, forming another frame exclusively interconnecting the first end of one of the first and second force sensing elements and the one of the first and second mounting elements corresponding thereto.

20. The method of claim 17 wherein forming the first and second force sensing elements further comprises, in the crystalline substrate, forming the first and second force sensing elements in a laterally spaced-apart arrangement; and wherein forming the coupling frame further comprises, in the crystalline substrate, forming an arm extending between the first and second force sensing elements.

* * * * *

UNITED STATES PATENT AND TRADEMARK OFFICE
CERTIFICATE OF CORRECTION

| | |
|---|---|
| PATENT NO. | : 7,444,883 B2 |
| APPLICATION NO. | : 11/317384 |
| DATED | : November 4, 2008 |
| INVENTOR(S) | : Mitchell J. Novak |

It is certified that error appears in the above-identified patent and that said Letters Patent is hereby corrected as shown below:

In the Specification

Col. 1, lines 5-9, "A U.S. Government contract provided by the terms of F29601-03-C-0124 awarded by the Air Force Research Laboratories (AFRL) may apply to this application. The U.S. Government may have certain rights pertaining to this application." should be changed to -- This invention was made with Government support under F29601-03-C-0124 awarded by the Air Force Research Laboratories (AFRL). The Government has certain rights in the Invention. --

Signed and Sealed this
Twenty-third Day of September, 2014

Michelle K. Lee
*Deputy Director of the United States Patent and Trademark Office*